Aug. 6, 1935.  J. R. JOHNSON ET AL  2,010,157
BORING MACHINE
Filed Jan. 16, 1933.  2 Sheets-Sheet 1
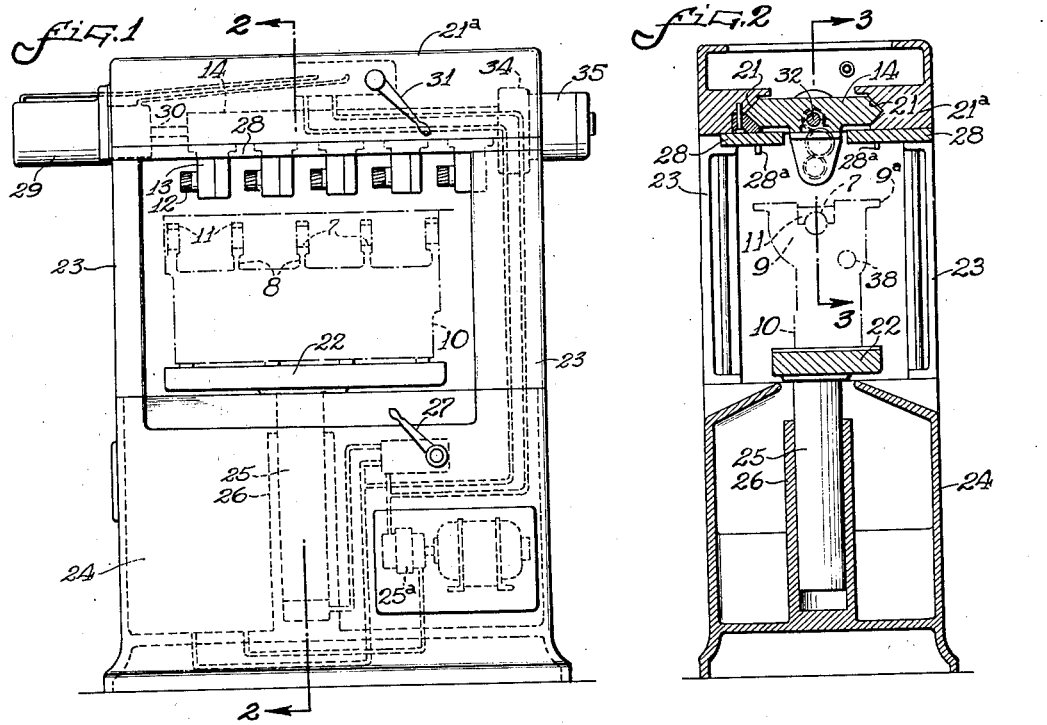
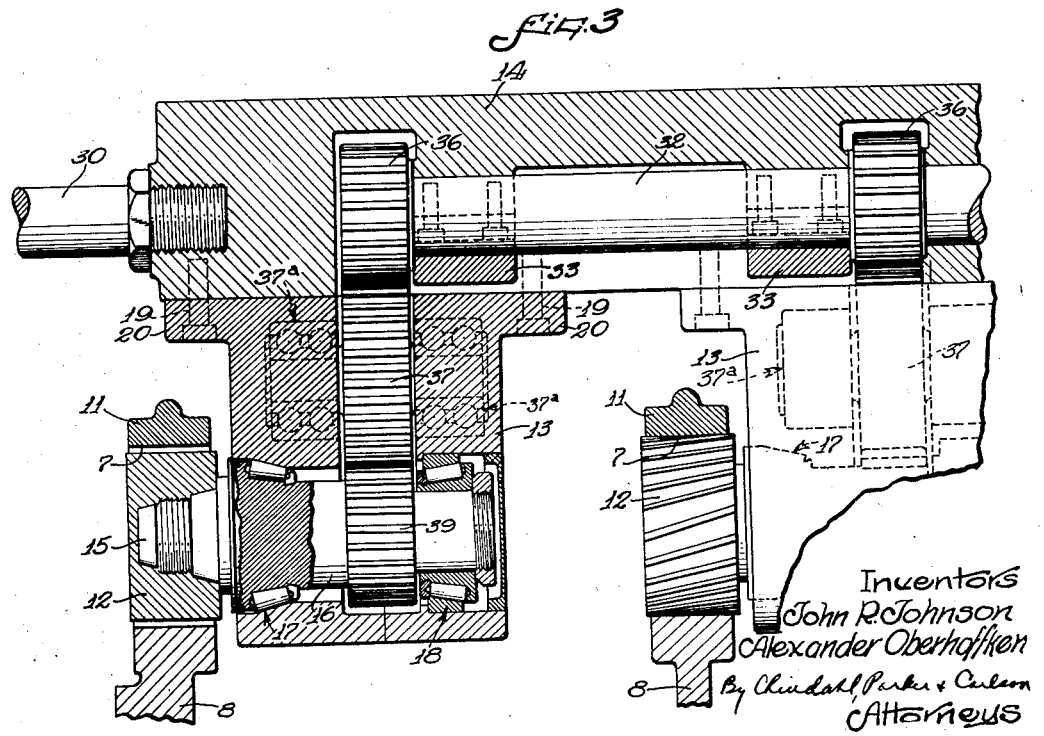

Aug. 6, 1935.   J. R. JOHNSON ET AL   2,010,157
BORING MACHINE
Filed Jan. 16, 1933   2 Sheets-Sheet 2
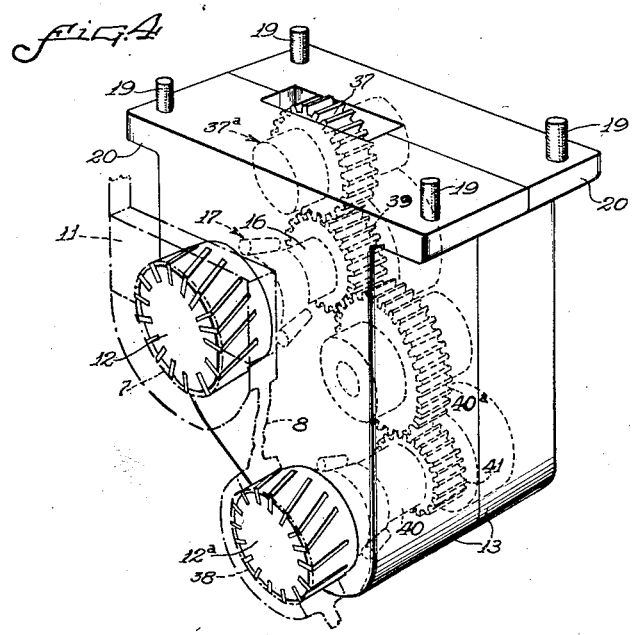
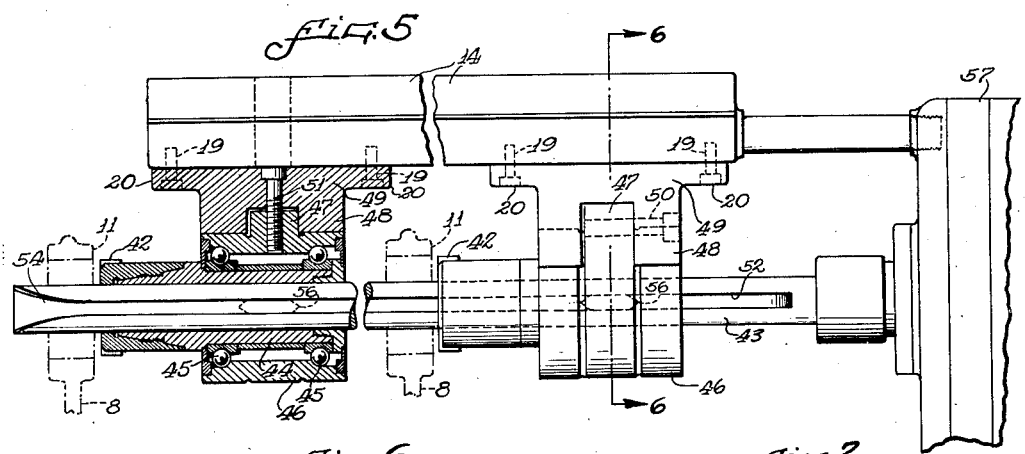
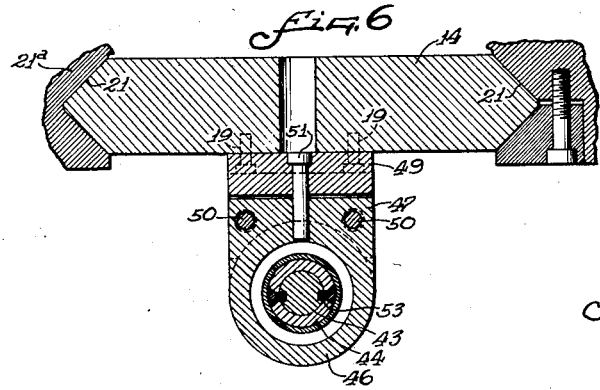
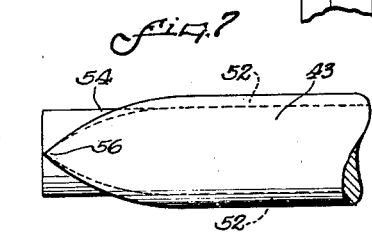
Inventors
John R. Johnson
Alexander Oberhoffken
By Lindell, Parker & Carlson
Attorneys Patented Aug. 6, 1935

2,010,157

UNITED STATES PATENT OFFICE 2,010,157

BORING MACHINE

John R. Johnson and Alexander Oberhoffken, Rockford, Ill., assignors to Ingersoll Milling Machine Company, Rockford, Ill., a corporation of Illinois Application January 16, 1933, Serial No. 651,920

13 Claims. (Cl. 77—3)

This invention relates generally to improvements in machines for boring or reaming out holes in a plurality of laterally spaced plates and more particularly to a machine for boring the bearing holes in the webs or bearing bridges in the blocks of internal combustion engines. Herein the term "boring" is used in a generic sense and is intended to include other analogous operations such for example as reaming.

According to present practice, the bearing holes in the blocks of modern internal combustion engines are bored either by a single cutter fed axially through the successive bearing webs or by a plurality of single blade cutters spaced along a bar which is inserted in an endwise direction through the rough bores and then shifted laterally to position the different cutters for the boring operation. Among the objections to both of these methods are the time consumed in and the bulky equipment required for projecting the cutter supporting bars endwise through the block and withdrawal thereof after the boring. With each method, clearances of objectionable magnitude must be provided in the cutter mounting and the cutters must be set manually for each work-piece with the result that the bores cannot be formed and alined with the desired precision by boring operations alone.

The primary object of the present invention is to overcome the difficulties above enumerated through the provision of a new and improved boring machine by which a plurality of holes in laterally spaced plates may be bored simultaneously with great precision and by which the cutters for boring the different plates may be positioned quickly and conveniently relative to the successive work-pieces.

In carrying out this object, the invention contemplates the provision of individual mountings by which the different cutters may be brought into boring positions opposite the respective bridges of the block to be bored by relative movement between the bridge and cutters in a direction transversely of the axes of the cutters and longitudinally of said bridges, the cutters thereafter being fed simultaneously in an axial direction into the respective bridges.

Another object is to provide a novel means for rotating the cutters in a machine having the cutters mounted in the above manner.

A further object is to provide a novel boring machine of the above character which is adapted to bore the crank and cam shaft holes of an engine block simultaneously.

The invention also resides in the novel arrangement of the relatively movable parts by which compactness of the machine as a whole is obtained and the floor space occupied thereby reduced to a minimum, by which the machine is adapted for line production, and by which the machine may be adapted readily to changes in location of bearing centers.

Other objects and advantages of the invention will become apparent from the following detailed description taken in connection with the accompanying drawings, in which Figure 1 is an elevational view of a machine embodying the features of the present invention.

Fig. 2 is a sectional view taken along the line 2—2 of Fig. 1.

Fig. 3 is a fragmentary sectional view taken along the line 3—3 of Fig. 2.

Fig. 4 is a fragmentary perspective view illustrating the cutter mounting in a modified form of the invention.

Fig. 5 is a fragmentary view partially in section illustrating another modification of the invention.

Fig. 6 is a sectional view taken along the line 6—6 of Fig. 5.

Fig. 7 is a fragmentary plan view of the end portion of the drive shaft shown in Fig. 5.

In the exemplary form shown in Figs. 1 to 3, the invention is embodied in a machine for simultaneously boring out the crank-bearing holes 7 in a plurality of plates 8 constituting the webs or bridges extending transversely of the crankcase 9 of an internal combustion engine block 10. According to modern automotive practice, these recesses are disposed near the bottom opening in the crank-case and are defined in part by caps 11 removably secured to the respective bearing webs.

The invention contemplates boring the holes 7 simultaneously by multiple-blade cylindrical cutters 12 projecting laterally from individual supports in the form of arms 13 on the ends of which the cutters are rotatably mounted to turn about an axis extending transversely of the arms. The arms 13 project rigidly and in laterally spaced relation from a common support in the form of a carriage 14. As shown in Fig. 3, each cutter is detachably threaded onto the tapered end 15 of a spindle 16 which is substantially shorter in length than the distance between the adjacent bearing webs and therefore is adapted for bodily sidewise movement through the crank case opening into the space between the adjacent webs to be bored.

To provide an extremely rugged mounting for the cutters, each spindle 16 preferably is of solid construction and rotatably supported in two spaced anti-friction bearings 17 and 18, the former of which is disposed immediately adjacent the cutter and in the present instance is formed with raceways converging away from the cutter so as to withstand the end thrust on the spindle during boring. Lateral play in the bearing and deflection of the cutters is thus reduced to a minimum. Ruggedness of the mounting is also obtained by making the arms 13 of minimum length determined by the spacing of the holes 7 relative to the crank-case flange 9a and of sufficient width to provide for the desired lateral rigidity and spacing of the spindle bearings.

For purposes to appear later, each arm 13 preferably is made separate from the carriage 14 and in two parts separable along the longitudinal center line of the arm. These parts are secured together and the unitary individual cutter mounting rigidly attached to the carriage as by screws 19 threading into the carriage through flanges 20 on the ends of the arms opposite from the cutters. With the arms thus mounted on the common carriage, the axes of the cutters are fixed relative to each other according to the lengths and spacing of the arms and at all times remain in this relation. For boring the crank shaft holes in an engine block, the arms would, as shown in the drawings, all be of the same construction and fastened to the carriage so that the cutter axes are in exact alinement.

To simplify the construction of the machine as a whole and render the same readily adaptable to line production, it is preferred to bore out the holes 7 with the block 10 supported in inverted position and adapted for upward movement to bring the cutters into boring positions opposite the holes to be bored. For this purpose, the block to be bored is mounted on a vertically movable table and the carriage 14 is mounted for endwise reciprocation above the table in opposed horizontal ways 21 with the arms 13 projecting downwardly toward the crank-case opening in the block. The ways 21 are formed by a bridge 21a rigidly joining the upper ends of corner posts 23 upstanding from a hollow base 24.

Raising and lowering of the block 10 may be effected in any preferred manner. Herein this is accomplished hydraulically and to this end, the table is mounted on the upper end of a plunger 25 slidable in a cylinder 26 which is housed within the base 24 and arranged to be supplied with fluid placed under pressure by a motor driven pump 25a. Through the medium of a lever 27 for actuating a suitable control valve, fluid from the pump may be admitted to the lower end of the cylinder or fluid in the cylinder is exhausted to a supply reservoir and the table thus raised or lowered as desired. Suitable means is provided for positioning the block properly with respect to the cutters 12 as the table is raised. Herein this means comprises plates 28 secured to the bridge 21a and dowel pins 28a adapted to enter dowel holes in the crank-case flange as the block abuts against the plates 28. The plates serve to locate the cutters and block in a vertical direction while the dowel pin locates the block horizontally.

If desired, longitudinal reciprocation of the carriage 14 to feed the cutters axially into and out of the holes 7 may also be accomplished hydraulically. Herein an hydraulic cylinder 29 arranged at one end of the carriage has a piston therein connected by a rod 30 to one end of the carriage. By shifting a lever 31 to control a suitable valve selectively, fluid may be admitted to either end of the cylinder 29 and the carriage thereby moved in either direction.

The different cutters 12 are rotated during boring from a common drive shaft which, in the preferred embodiment of the invention, is spaced from the cutter axes and has a separate driving connection with each of the individual cutters which connections remain engaged during entry of the cutters into and removal thereof from the block. In the present instance, the drive shaft, indicated by the numeral 32, extends parallel to the cutter axes and is journaled in bearings 33 on the carriage 14 so as to move with the latter during boring. Through suitable speed reduction gearing within a gear box 34, the shaft 32 is driven from an electric motor 35 mounted at the end of the carriage opposite the cylinder 29.

For the sake of compactness and ready detachability of the individual cutter supports, the driving connection between the shaft 32 and each cutter 12 preferably comprises a spur gear train including a gear 36 fast on the shaft and meshing with a gear 37 rotatably supported by anti-friction bearings 37a near the fixed end of the arm 13. The gear 37 meshes with a gear 39 fast on the cutter spindle 16 between the bearings 17 and 18. Convenient assembly of the spindle bearings and the gears is made possible with the two part construction above formed which, owing to the mounting of the meshing gears 36 and 37 on the carriage 14 and the arm 13 respectively, permits ready detachment and replacement of the cutter support.

In the operation of boring a cylinder block with the machine above described, the block is first located on the table 22 with the spaces between the adjacent bearing bridges 8 positioned in vertical alinement with the cutter supports 13 in their retracted position shown in Fig. 1. By operating the lever 27, the table is raised whereupon the cutters enter the crank-case opening and the spaces between the bearing plates, the motion of the table being arrested when the crank-case flange engages the stops 28. The cutters are now properly positioned opposite the recesses to be bored. With the motor 35 running, the lever 31 is manipulated to cause the carriage 14 to be fed in a direction to move the cutters through the rough holes 7. Upon completion of the bores, the carriage is retracted to the position shown in Fig. 1 after which the table 22 is lowered to permit removal of the block from the table.

The boring machine above described is readily adaptable to the boring of additional holes such as the cam-shaft bearing holes 38 simultaneously with the boring of the crank-shaft holes. In such a case, a second cutter 12a (see Fig. 4) corresponding to the size of the hole to be formed is secured to a spindle 40 mounted in anti-friction bearings supported in each arm 13 in the same manner as the spindle 16. The cutters 12 and 12a on each arm 13 are of course located in the same positional relation as the axes of the crank and cam shaft holes to be formed on any one of the bearing bridges 8. A single gear train may be employed to drive both of the cutters 12 and 12a. For this purpose, a spur gear 40a rotatably supported on the arm is interposed between the spindle gear 39 and a gear 41 on the spindle 40.

Figs. 5 and 6 illustrate an alternative arrangement in which the cutters 42 are spindles in the form of sleeves 44 mounted on arms projecting from the carriage 14 and adapted to receive and be coupled to a common drive shaft 43 which is projected endwise through the hollow cutters after the latter have been moved into boring positions. In the present instance, the sleeves 44 are journaled in anti-friction and thrust bearings 45 supported by a sleeve 46 having a squared protection 47 received between a downwardly projecting flange 48 on a block 49 bolted to the carriage 14. The sleeve 46 is secured to the block in fixed position by screws 50 threading into the projection 47 through one of the flanges 48 and a screw 51 threading into the projection through the block 49. The block 49 and the sleeve 46 when thus locked together form an arm supporting the cutter with the desired rigidity and adapted to enter the space between two of the adjacent bearing webs 8 to be bored, the same as in the preferred machine first above described.

To form a driving connection between the shaft 43 and each of the cutters 42 and at the same time permit of insertion of the shaft through the cutters, two radial grooves 52 are formed throughout the length of the shaft and shaped to receive keys 53 on the cutters 42. The necessity for having the tongues 53 of the different cutters alined before the shaft is inserted is avoided by flaring the ends of the grooves as indicated at 54 so that they intersect at points 55 and tapering each key to a point 56. The shaft 43 is supported by a head 57 mounted in any suitable manner for reciprocation in a direction to project the shaft axially of the cutters 42 when the latter are positioned for boring.

In operation of the machine equipped with the cutter drive illustrated in Fig. 5, relative movement of the carriage and the block 10 to position the cutters for boring is produced while the shaft 43 is withdrawn, the same as with the preferred form of machine first described. Next, the shaft is projected axially through the cutters 42 by movement of a head 57 which engages the carriage 14 after all of the cutters have been coupled to the shaft 43. By continued movement of the head at a slower speed, the cutters are fed into the respective holes. Before the block is lowered after boring, it will of course be necessary to withdraw the drive shaft 43.

From the foregoing, it will be apparent that advantage has been taken of the relatively wide spacing and the location of the bearing holes in modern automotive engine blocks and a machine has been provided by which the bearing holes in the different bridges may be bored at high speed, with minimum equipment and labor costs and with the precision required by present automotive practice. Accuracy in the size and alinement of the bores is due to the ruggedness of the individual cutter mountings, the reduction of bearing clearances to a minimum, and the maintenance of a fixed relation between the different cutters while successive blocks are being bored. The operating strokes of all of the moving parts are relatively short which further contributes to the ruggedness, simplicity and compactness of the machine as a whole.

Because of the high degree of accuracy obtainable with the present machine, the bearing holes in the work-piece may be rough-bored and finished in machines of the same character and in a minimum number of operations. Moreover, accurate positioning of the cutters for each operation is greatly simplified by mounting of the cutters so that they may be set for boring by a single relative movement between the work-piece and the carriage 14 in a direction longitudinally of the plates to be bored. In addition, the machine occupies a minimum of floor space, and is readily adaptable to line production and to changes in the locations of the bearing in the work-piece and relative to each other. Thus, changes in the lateral or longitudinal positions of the holes 7 may be effected simply by changing the positions of the stops 28 and the dowel pins 28ᵃ. Changes in the number of holes, or in axial spacing thereof or in the lateral spacing of the crank and cam shaft holes relative to each other may also be effected quickly and conveniently and at a small expense simply by replacing the arms 13 with others on which the cutters are properly positioned.

We claim as our invention:

1. A machine for simultaneously boring the cam and crank shaft bearing holes in the bridges of a multi-cylinder engine block comprising, in combination, means for supporting a block to be bored, a support extending along said block opposite the crank case opening therein, a plurality of arms projecting rigidly from said support toward said opening and arranged in spaced relation to enter said opening between the bearing bridges to be bored, a plurality of boring cutters rotatably mounted on the respective arms to turn about a common axis, a plurality of boring cutters rotatably mounted on the respective arms to turn about a common axis extending parallel to said first mentioned axis and spaced therefrom a distance equal to the spacing of the cam and crank shaft holes to be formed, means for effecting relative bodily movement between said block and said support to project said arms into said openings and bring the axes of said cutters simultaneously into alinement with axes of the cam and crank-shaft holes to be bored, a rotary drive shaft parallel to the axes of said cutters, a gear train on each of said arms driven from said drive shaft and driving both of the cutters mounted on the arm, and means for effecting relative feeding movements between said block and said support to carry each set of cutters into operative association with the respective bridges.

2. A machine for simultaneously boring a plurality of axially spaced bearing holes in the bridges of an engine block comprising, in combination, means supporting a block to be bored, a support extending along said block opposite the crank-case opening therein, a plurality of parallel laterally spaced arms projecting rigidly from said support toward said opening and adapted to enter the spaces between the bridges to be bored, a plurality of boring cutters rotatably mounted on the respective arms to turn on a common axis disposed parallel to the axis of the holes to be bored, a drive shaft rotatably mounted on said support and extending parallel to the cutter axis, a plurality of spur gear drive connections mounted on the respective arms and each interposed between said shaft and one of said cutters, means for effecting relative movement between said support and the block to be bored whereby to project said arms through the crank-case opening and bring each of said cutters into boring position, and means for feeding said support longitudinally of the cutter axis to move the cutters into engagement with the respective bridges.

3. A machine for boring holes simultaneously in the bearing bridges of an internal combustion engine block comprising, in combination, a support for said block, a second support extending transversely of and overlapping substantially all of said bridges and mounted independently of said block support, a plurality of arms rigid with said second support and spaced apart to correspond to the spacing of said bridges, cutters rotatably mounted on and held against axial movement relative to the respective arms with their axes located according to the spacing of the holes to be bored, said arms and the cutters thereon entering between the adjacent bridges upon relative movement between the block and the cutter support in a direction transversely of said axes, guide means mounting said supports for relative movement in the direction of the axes of said cutters, power driven mechanism for effecting such relative movement to feed the cutters into operative engagement with the bridges, and a common power shaft disposed externally of and extending along the block when said cutters are in operating position and having a constantly engaged driving connection with each of said cutters.

4. A machine for boring holes simultaneously in the bearing bridges of an internal combustion engine block comprising, in combination, a support for said block, a second support extending transversely of and overlapping all of said bridges and mounted independently of said block support, a plurality of arms rigid with and secured to said second support for individual detachment and removal therefrom, cutters rotatably mounted on and held against axial movement relative to the respective arms with their axes located according to the spacing of the holes to be bored, said arms being spaced along said second support at distances corresponding to the spacing of said bridges so as to be received between the adjacent bridges upon relative movement between the block and the cutter support in a direction transversely of the cutter axis, guide means mounting one of said supports for movement in the direction of said axes, power driven mechanism for actuating the movable support to feed the cutters into the respective bridges, and a power driving means disposed externally of the block to be bored and having individual driving connections to the respective cutters, each of said connections being detachable to permit detachment and removal of said arms.

5. A machine for simultaneously boring the cam and crank shaft bearing holes in the bridges of a multi-cylinder engine block comprising, in combination, means for supporting a block to be bored, a support extending along said block opposite the crank case opening therein, a plurality of arms projecting rigidly from said support toward said opening and arranged in spaced relation to enter said opening between the bearing bridges to be bored, a plurality of boring cutters held against relative axial movement and rotatably mounted on the respective arms to turn about a common axis, a plurality of boring cutters rotatably mounted on the respective arms to turn about a common axis extending parallel to said first mentioned axis and spaced therefrom a distance equal to the spacing of the cam and crank shaft holes to be formed, said arms entering said opening upon relative bodily movement between said block and said support toward each other whereby to bring the axes of said cutters simultaneously into alinement with the axes of the cam and crank shaft holes to be bored, power driving means disposed externally of the block when said cutters are in operating position, gears on each of said arms driven from said driving means and driving both of the cutters mounted on the arm, and means for effecting relative feeding movements between said block and said support to carry each set of cutters into operative association with the respective bridges.

6. A machine for simultaneously boring a hole in each bearing bridge of an internal combustion engine block comprising, in combination, a support for said block, a second support extending along the crank case opening of said block and transversely of said bridges, a plurality of arms rigid with said second support and spaced apart to correspond to the spacing of said bridges, cutters rotatably mounted on the respective arms with their axes located according to the spacing of the holes to be bored and projecting from the arms in the direction of the respective bridges, said cutters being held against axial movement relative to each other, guide means mounting said supports for relative movement in a direction parallel to and also in a direction perpendicular to the axes of said cutters, power driven mechanism operating after alinement of the cutters with the holes to be bored to move said supports relative to each other and feed the cutters axially into an operative engagement with the bridges so as to bore the same simultaneously, and power driven mechanism for rotating said cutters having individual driving connections extending to the respective cutters along the supporting arms thereof whereby to permit the boring operation to be started immediately upon alinement of the cutters with the holes to be bored.

7. A machine for simultaneously boring a hole in each bearing bridge of an internal combustion engine block comprising, in combination, a support for said block, a second support extending along the crank case opening of said block and transversely of said bridges, a plurality of arms rigid with said second support and spaced apart to correspond to the spacing of said bridges, cutters rotatably mounted on the respective arms with their axes located according to the spacing of the holes to be bored and projecting from the arms in the direction of the respective bridges, said cutters being held against axial movement relative to each other, guide means mounting said supports for relative movement in a direction parallel to the axes of said cutters, power driven mechanism operating after alinement of the cutters with the holes to be bored to move said supports relative to each other and feed the cutters axially into an operative engagement with the bridges so as to bore the same simultaneously, trains of individual gears mounted on the respective cutter arms to turn about axes extending parallel to the cutter axes and providing rotary drive connections extending through the crank case opening of said block to the respective cutters, and a power driving means disposed externally of the block for imparting rotary power to said driving connections.

8. A machine for simultaneously boring the cam and crank shaft bearing holes in the bridges of a multi-cylinder engine block comprising, in combination, means for supporting a block to be bored, a support extending along said block opposite the crank case opening therein, a plurality or arms projecting rigidly from said support toward said opening and arranged in spaced relation for entry between the bearing bridges to be bored, a plurality of boring cutters rotatably mounted on the respective arms to turn about a common axis, a plurality of boring cutters rotatably mounted on the respective arms to turn about a common axis extending parallel to said first mentioned axis and spaced therefrom in accordance with the spacing of the cam and crank shaft holes to be formed, means for effecting relative bodily movement between said block and said support to project said arms through said opening and bring the axes of said cutters simultaneously into alinement with the axes of the cam and crank shaft holes to be bored, a common power shaft having individual rotary drive connections with the cutters of one set, independent rotary driving connections mounted on said arms for extending the drive of said shaft to the cutters of the other set, and means by which said support and block may be fed relative to each other in the direction of said axes.

9. A machine for simultaneously boring the shaft bearing holes in the bearing bridges of a multiple cylinder internal combustion engine block comprising, in combination, a support for said block, a second support extending along the crank case opening of said block and transversely of said bridges, a plurality of arms rigid with said second support and spaced apart to correspond to the spacing of said bridges, cutters each rotatably mounted on the respective arms with their axes disposed for location simultaneously in boring position opposite the holes to be bored on projection of the arms through said crank case opening, said cutters being held against axial movement relative to each other, guide means mounting said supports for relative movement in a direction parallel to and also in a direction perpendicular to the axes of said cutters, power driven mechanism operable after alinement of the cutters with the bearing holes to be bored to move said supports relative to each other and feed the cutters axially into operative engagement with the bridges so as to bore the same simultaneously, and a common power driven shaft extending longitudinally of said block and having individual drive connections with the respective cutters.

10. A machine for simultaneously boring a set of shaft bearing holes in the bearing bridges of a multiple cylinder internal combustion engine block comprising, in combination, a stationary member having spaced guides providing an elongated horizontal guideway, a platen on which said engine block may be mounted in inverted position beneath said guideway, means by which said platen may be elevated to a position for pressing the crank case flange of said block against said member, an elongated slide reciprocable in said guideway parallel to the axes of said holes, a plurality of arms rigid with said slide and spaced apart to correspond substantially to the spacing of said bridges, cutters each rotatably mounted on one of said arms with their axes located for alinement simultaneously with the holes to be bored as an incident to clamping of the block against said member, said cutters being held against axial movement relative to each other, power driven mechanism operable after clamping of said block in working position to move said slide in a direction to feed said cutters axially into operative engagement with the respective bridges so as to bore said holes simultaneously, and a rigid power driven shaft extending longitudinally of said block and having individual driving connections with the respective cutters for rotating the same during the advance of said slide.

11. A machine for boring a plurality of spaced walls of a work piece having a lateral opening between said walls comprising, in combination, means for locating said work piece in two transverse directions in position to be operated upon including an abutment against which said work piece is pressed, a tool support adjacent the abutment extending transversely of said walls, a plurality of arms projecting rigidly from said support and spaced to correspond to the spacing of said walls so that one of the arms will enter said opening and the arms will be projected alongside the respective walls when the work piece is placed against said abutment, cutters rotatably mounted on the respective arms and projecting in the same direction laterally therefrom, said support, said arms and said cutters constituting a tool unit, means mounting said tool unit and said abutment for relative movement parallel to the axis of said cutters, power driven mechanism operable to effect such movement and feed the cutters axially in unison into operative engagement with the respective walls so as to bore the same, power driving means disposed externally of said work piece, and individual drive connections extending therefrom along said arms to the respective cutters.

12. A machine for boring a plurality of spaced walls in a work piece having a lateral opening between each two adjacent walls, said machine comprising, in combination, a horizontally disposed slideway, a tool slide reciprocable in said slideway, a stationary downwardly facing abutment adjacent said slide, means by which said work piece may be raised into operating position against said abutment, means for transversely positioning said work piece relative to said abutment, a plurality of downwardly projecting arms rigid with said slide and spaced therealong to correspond to the spacing of said walls whereby the arms will be disposed alongside the respective walls to be bored when said work piece is placed in said operating position, boring tools rotatably mounted on and projecting horizontally and in the same directions from the end portions of said arms, said tools being held against relative axial movement and having their axes disposed horizontally and located to coincide with the axes of the holes to be bored, means by which said slide may be advanced to feed said tools into cutting engagement with the respective walls, and means for driving said cutters including individual driving connections extending along the respective arms.

13. A machine for simultaneously boring a plurality of spaced walls of a work piece having a lateral opening between the adjacent walls comprising, in combination, means for locating said work piece in two transverse directions in position to be operated upon including an abutment against which said work piece is pressed, a tool support adjacent said abutment and extending therealong, a plurality of arms projecting rigidly from said support and spaced to correspond to the spacing of said walls so that the arms will be positioned alongside the respective walls in the positioning of said work piece, cutters each rotatably mounted on the respective arms and projecting laterally in the same direction therefrom, said cutters being held against axial movement relative to each other, means mounting said support and abutment for relative movement to feed the cutters axially in unison into operative engagement with said walls so as to bore the same, power driving means disposed externally of said work piece, individual drive connections extending from said power driving means to the respective cutters, and a second cutter on one of said arms driven from one of said connections and operating during said feeding movement to bore a second portion of one of said walls.

JOHN R. JOHNSON.
ALEXANDER OBERHOFFKEN.